PHONOGRAPH PICKUP CARRIAGE

Filed Aug. 31, 1964 2 Sheets-Sheet 1

INVENTOR.
FRED SCHROEDER, JR.
BY White & Haefliger
ATTORNEYS.

INVENTOR.
FRED SCHROEDER, JR.
BY White & Haefliger
ATTORNEYS.

United States Patent Office 3,319,966
Patented May 16, 1967

3,319,966
PHONOGRAPH PICKUP CARRIAGE

Fred Schroeder, Jr., Van Nuys, Calif., assignor to Superscope Incorporated, Sun Valley, Calif., a corporation of California Filed Aug. 31, 1964, Ser. No. 393,013
12 Claims. (Cl. 274—23)

This invention relates generally to recording pickups, and more particularly concerns the elimination of pickup tracking error with respect to phonograph record grooves.

In the past, phonograph pickup arms have commonly been mounted to swing or pivot as the pickup element, such as a diamond stylus, tracks in the record groove; however, since the pickup pivot axis is normally at a fixed distance from the axis of record rotation, the pickup cannot remain in a state of tangency with respect to the passing groove for the entire length of track at the point of contact with the groove side walls. This problem becomes critical in stereo systems, since the pickup stylus then slowly changes its aspect of tracking presentation with respect to the dual channels at the groove side walls over the length of track, whereby an out of phase relationship arises as respects the two signals produced in response to tracking element relative travel along the groove side walls.

The above problem and others associated with conventional pickup are solved by the present invention in what may be considered a highly unusual manner. Basically, the invention is embodied in a device including a carriage for essentially frictionlessly guiding a recording pickup to travel bodily in traversing relation to the recording, and comprises a pair of simultaneously swingable assemblies characterized as complementary, a pickup support carried for displacement in response to assembly swinging, and means mounting the assemblies to swing mutually oppositely and about generally parallel axes and synchronizing their swinging to effect pickup support displacement along a predetermined path during pickup travel. Typically, the assemblies include first and second pairs of complementary members, the pickup support is carried on at least one of the members of the second pair, and the members of each pair are mounted to swing mutually oppositely with the second pair of members pivotally carried by the first pair of members.

Advantages flowing from the unusual construction described above and to be described include not only the maintenance of desired tangency of the pickup with respect to the passing groove, but also the reduction of tracking friction and track noise, the maintenance of equal tracking pressure on both portions or halves of the groove as well as correct stereo phasing and balance, and increased record and diamond or tracking element life.

Other unusual features of construction contributing to the above mentioned advantages and results include the provision of a first pair of pivots respectively mounting the members of the first pair to swing mutually oppositely, and gearing carried on the first pair of members in spaced relation to the pivots to remain intermeshing during member swinging; a second pair of pivots mounting the second members on the first members and to swing mutually oppositely, and gearing carried on the second pair of members to remain intermeshing during member swinging; the provision for linear movement of the pickup support, and for auxiliary swinging of the support upwardly and downwardly; and the incorporation of the carriage mechanism including the pairs of swinging members below the top surface level of a turntable and generally at one side thereof in such manner as to eliminate need for elongated pickup arms which in the past were resorted to in an effort to eliminate tracking error.

These and other objects and advantages of the invention, as well as the details of illustrative embodiments, will be more fully understood from the following detailed description of the drawings in which.

Figure 1:
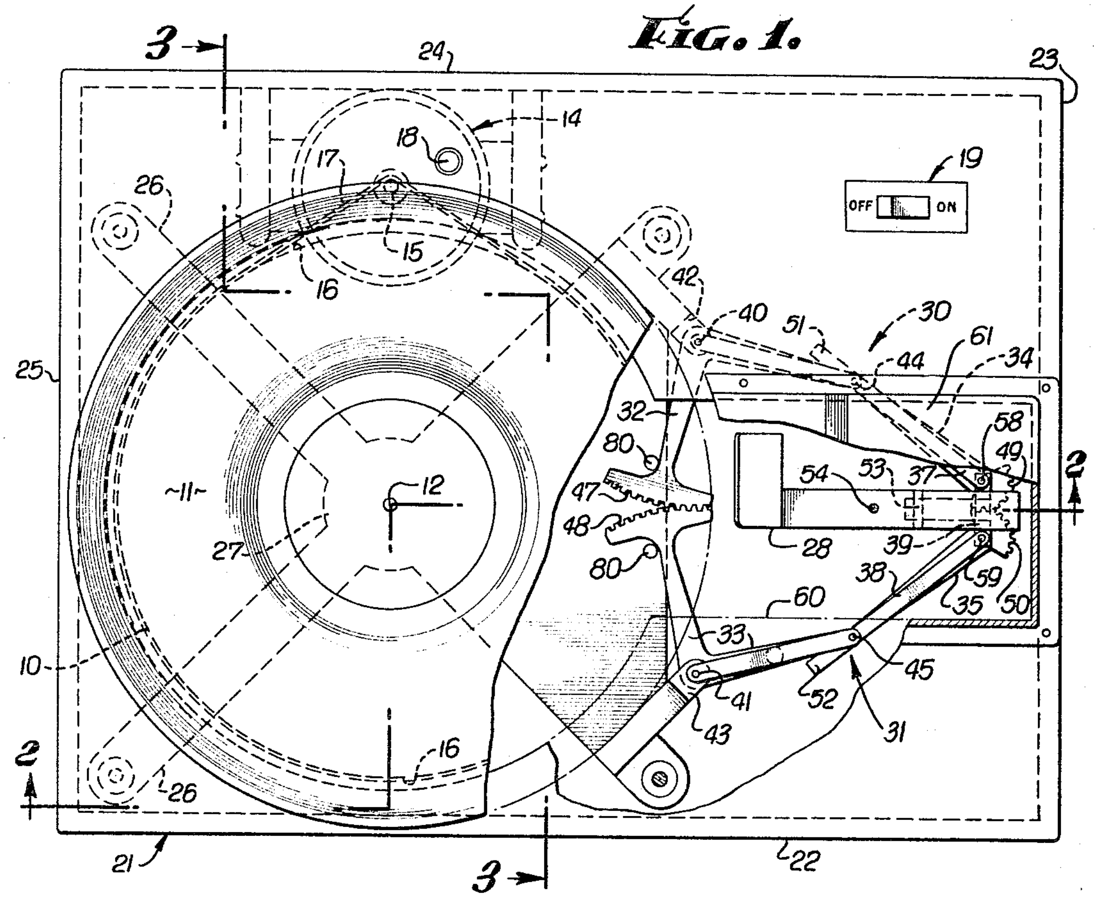
FIG. 1 is a top plan view of a turntable and associated drive and enclosure or chamber, with which the novel pickup guiding device is incorporated.

The assembly seen in the drawings includes a horizontal turntable 10 supporting a phonograph record 11 to turn about a vertical axis 12. The table may be suitably centrally supported as at 13 and driven as by a motor 14 and drive belt 17 wrapping about the motor driven capstan 15 and the table skirt 16. FIG. 1 shows a speed control 18 for the motor and operable to select the desired record speed. An on-off switch for the drive is seen at 19 on the top panel 20 of cabinet or chamber 21, which encloses the turntable drive. Side walls of the chamber are seen at 22–25, and structure 27 suspended at 26 from the top 20 provides a bearing for turntable support 13.

Figures 4, 5:
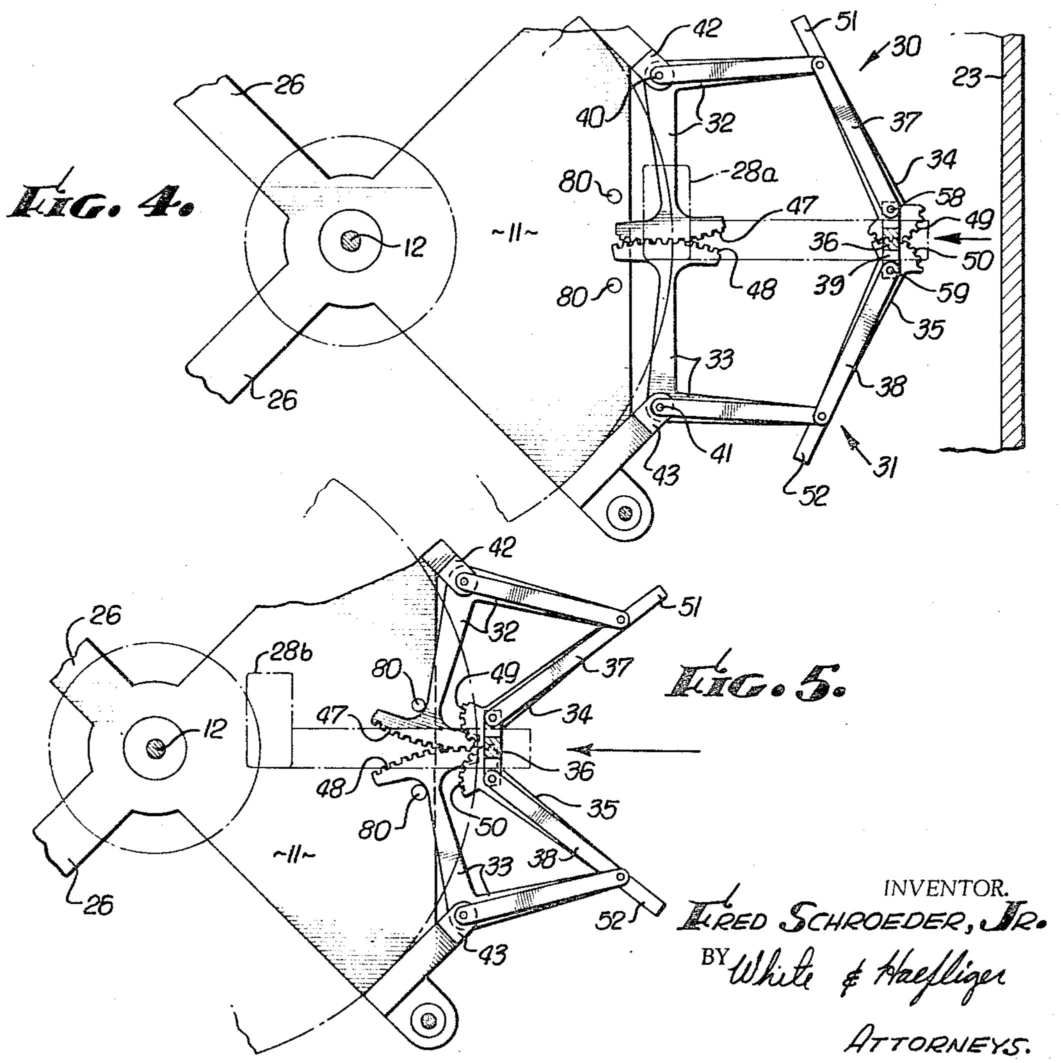
FIG. 4 is a fragmentary plan view of the pickup guiding device in a swing position associated with initial travel of the tracking element in the record groove.
FIG. 5 is a view like FIG. 4 showing the device in a later swing position associated with later travel of the tracking element in the record groove.

A phonograph pickup 28 is seen from the drawings to be subject to bodily travel between the outer full line position of FIG. 1, the intermediate broken line cue position 28*a* of FIG. 4, in which the pickup stylus is first applied to track in outer grooving on the record, and the inner, broken line end of play position 28*b* of FIG. 5 in which the stylus tracks in inner grooving of the record.

In accordance with the invention, a device is provided to essentially frictionlessly guide the pickup 28 to travel between these positions, and in traversing relation to the record. Basically, the device includes a pair of simultaneously swingable carriage assemblies characterized as complementary, one form of such assemblies being indicated generally at 30 and 31. Typically, the assemblies will include a first pair of complementary members, as for example those indicated at 32 and 33, and a second pair of complementary members such as at 34 and 35, the latter pair being typically carried by the first pair. Also, a support for pickup 28 is carried for displacement in response to assembly swinging, and typically with at least one of the members of the second pair. For example, in the drawings the support 36 is carried for displacement with both members 34 and 35 via arms 37 and 38 and cross piece 39 interconnecting the arms at axially vertical pivots 58 and 59. Arms 37 and 38 are respectively integral with members 34 and 35.

Further in accordance with the invention, means is provided for mounting the simultaneously swingable assemblies 30 as to swing mutually oppositely and about generally parallel axes and synchronizing said swinging to effect pickup support displacement along a predetermined path during pickup travel, as for example linearly between positions 28 in FIG. 1, 28a in FIG. 4, and 28b in FIG. 5. One such means may include pivots such as the first pair of pivots 40 and 41 respectively mounting the members 32 and 33 of the first pair to swing mutually oppositely with respect to one another and also to pivot support structure 42 and 43, which is also suspended at 26 from the table top; also the illustrated example includes a second pair of pivots 44 and 45 respectively mounting the members 34 and 35 of the second pair on the members 32 and 33 respectively of the first pair and to swing mutually oppositely.

Members 32 and 33 may each have bell crank form as seen to allow members 34 and 35 to swing overcenter in traveling between the full line outer or extended position of FIG. 1, and collapsed inner position of FIG. 5, whereby a surprising economy of space occupied by the guiding device is achieved, without sacrifice of pickup displacement. Also, stops 80 limit pivoting of arms 32 and 33 in FIG. 5.

The above referred to means may also include synchronizing structure, such as gearing carried at 47 and 48 on the members 32 and 33 of the first pair, in spaced relation to pivots 40 and 41, to remain intermeshed during member swinging. Thus, the spur gearing illustrated may swing about the axes of pivots 40 and 41 to achieve the desired continued intermeshing relationship during swinging. The synchronizing structure also typically includes gearing carried at 49 and 50 on the members 34 and 35 of the second pair in spaced relation to pivots 44 and 45 to remain intermeshing during member swinging. As illustrated, spur gearing 49 and 50 may swing about the axes of pivots 44 and 45 to achieve continued intermeshing; further, however, gearing 49 is formed on a circle the center of which is defined by the axis of pivot 58, and gearing 50 is likewise formed on a circle the center of which is defined by the axis of pivot 59, whereby the pickup support 36 is kept oriented as shown in FIG. 2, without rotating about a verticel axis, during its inward and outward travel with respect to record 11.

Since the guiding function is achieved by the use of low friction pivots and spur gearing at load transfer points, the movement is seen to be operable with extremely low frictional resistance, whereby it may be characterized as "essentially frictionless," or floating. Counterweighting of the movement at 51 and 52 further balances the device.

Finally, a pivot such as is seen at 53 is carried by support 36 and characterized in that the pickup 28 may then be swingable upwardly and downwardly under auxiliary control, as by manual member 54, so that the stylus 55 may be controllably positioned radially with respect to the record 11.

Figure 2:
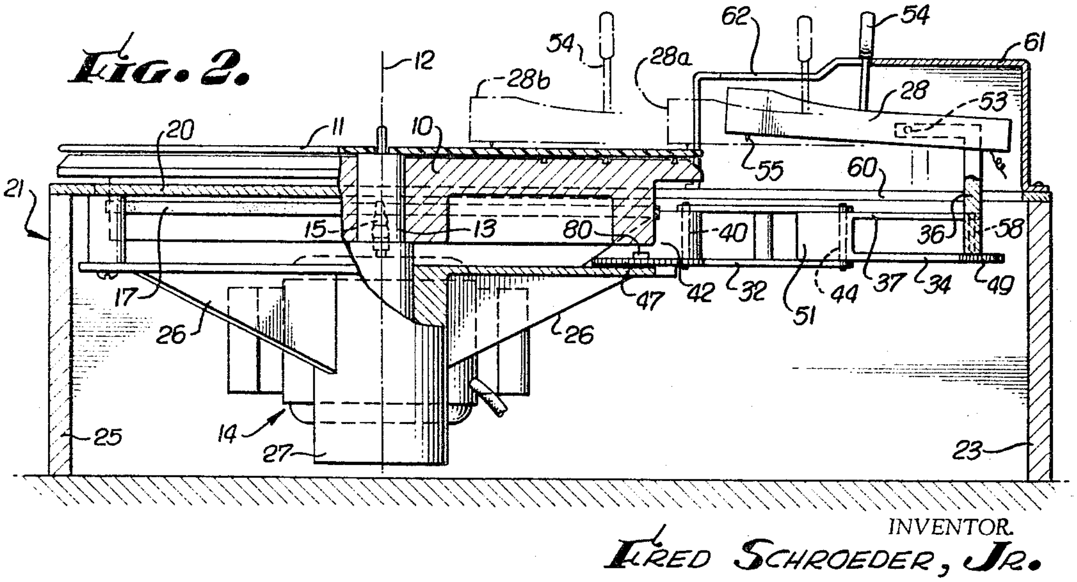
FIG. 2 is a vertical section taken on line 2—2 of FIG. 1.
Figure 3:
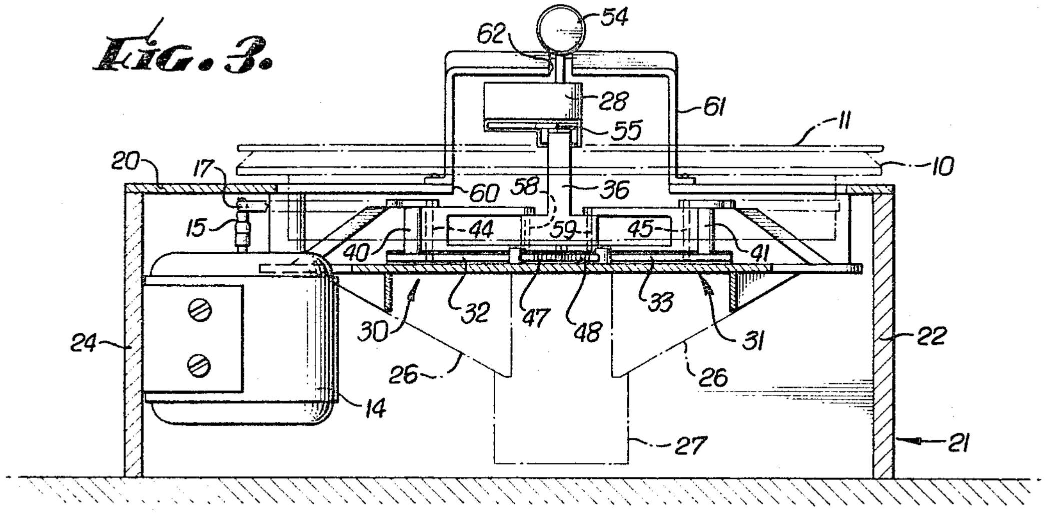
FIG. 3 is a vertical section taken on line 3—3 of FIG. 1.

Support 36 is seen in FIG. 2 as projecting upwardly from the locus of members 34 and 35 below the top surface level of table 10, through a slot 60 in table 20 and into the interior of an enclosure 61 carried on table 20 and housing the pickup 28 in its outermost or retracted position. Control 54 projects upwardly through a radial slot 62 in the enclosure 61 to be manually accessible.

Finally, it is pointed out that the invention is applicable to a vertically oriented system where the pickup is mounted to travel in or parallel to a vertical plane during its traversal of a recording. Also, the invention is applicable to a system using magnetic phonograph records or recordings, since the direction of working gap of the magnetic head relative to record tracks is always constant during the entire travel of the head.

I claim:

1. In a device for essentially frictionlessly guiding a recording pickup to travel bodily in traversing relation to the recording, first and second pairs of complementary members, a pickup support carried for displacement with at least one of the members of the second pair, and means mounting the members of each pair to swing mutually oppositely with the second pair of members pivotally carried by the first pair of members and said means synchronizing said swinging to effect pickup support displacement along a predetermined path during said pickup travel, said means including a first pair of pivots respectively mounting the members of the first pair to swing mutually oppositely, and gearing carried on said first pair of members in spaced relation to said pivots to remain intermeshing during said swinging.

2. The combination of claim 1 in which said means includes a second pair of pivots respectively mounting the members of said second pair on the members of the first pair and to swing mutually oppositely, and gearing carried on the second pair of members in spaced relation to said second pair of pivots to remain intermeshing during said swinging, the second pair of pivots being spaced from the first pair of pivots.

3. The combination of claim 2 in which said predetermined path has a horizontally linear center line, the first pivots spaced symmetrically at horizontally opposite sides of said line during said swinging, and the second pivots spaced symmetrically at horizontally opposite sides of said line during said swinging, the pivot axes extending generally vertically.

4. The combination of claim 3 including a pivot carried by said support and about which the pickup is swingable upwardly and downwardly.

5. The combination of claim 3 including a turntable having a vertical axis of rotation, said center line extending toward said axis.

6. The combination of claim 5 in which said members extend below the top surface level of said turntable and generally at one side thereof, a turntable drive, a chamber enclosing said drive and said members, and a pickup carried by said support to move above the chamber top in radially traversing relation to a phonograph record on the turntable.

7. The combination of claim 6 including an enclosure housing said pickup in a position generally radially outwardly of the record locus on the turntable, and a control operable to advance the pickup radially toward the record.

8. In a device for essentially frictionlessly guiding a recording pickup to travel bodily in traversing relation to the recording, a pair of bell crank levers having horizontally-spaced, stationarily-mounted, vertical-axis pivots about which the levers rotate, one leg of each lever terminating adjacent a complementary leg of the other lever, means interengaging said adjacent leg ends for rolling movement relative to each other to synchronize rotation of the levers in opposite directions, a pair of simple levers each pivotally connected to one of the other legs of the bell crank levers, a link pivotally interconnecting the ends of said simple levers remote from said bell crank levers so as to maintain said remote ends adjacent to each other, means interengaging said adjacent ends of said simple levers for rolling movement relative to each other to synchronize the rotating movements of said simple levers in complementary opposite directions, and a pickup support connected to said simple levers for movement in a substantially straight line radially of said recording guided by movements of said bell crank and simple levers.

9. The device defined in claim 8 in which said pickup support is mounted on the link interconnecting the adjacent ends of said simple levers.

10. The device defined in claim 8 in which the location of said pivots is such as to cause continuous rolling movement in the same direction between the adjacent ends of the simple levers as the pickup support moves from a remote position toward the center of the recording, while the bell crank levers rotate first in the direction away from the recording and then in the opposite direction toward the recording as the simple levers pass through an aligned position to go over center in the opposite direction from that of their remote position.

11. The device defined in claim 8 in which the means interengaging the adjacent ends of said simple levers are in the form of meshing gear sectors whose centers coincide with the pivotal connections of the link with the adjacent ends of the simple levers.

12. The device defined in claim 11 in which the means interengaging the adjacent leg ends of the bell crank levers are in the form of meshing gear sectors whose centers coincide with the pivots of the bell crank levers.

References Cited by the Examiner

UNITED STATES PATENTS

| | | | |
|---|---|---|---|
| 2,837,339 | 6/1958 | Rhodes | 274—23 |
| 2,937,877 | 5/1960 | Lange | 274—23 |
| 2,977,126 | 3/1961 | Chalfin | 274—23 |

NORTON ANSHER, *Primary Examiner.*

C. B. PRICE, *Assistant Examiner.*